(12) United States Patent
Nasli Bakir et al.

(10) Patent No.: US 12,163,064 B2
(45) Date of Patent: Dec. 10, 2024

(54) PROCESS FOR PREPARING A BONDING RESIN

(71) Applicant: Stora Enso OYJ, Helsinki (FI)

(72) Inventors: Ben Nasli Bakir, Saltsjö-Boo (SE); Staffan Torssell, Bromma (SE); Lars Hjelm, Hägersten (SE); Li Jansson, Älta (SE); Huynh Tram Anh Pham, Älvsjö (SE); Ashar Zafar, Älta (SE)

(73) Assignee: Stora Enso OYJ, Helsinki (FI)

( * ) Notice: Subject to any disclaimer, the term of this patent is extended or adjusted under 35 U.S.C. 154(b) by 907 days.

(21) Appl. No.: 17/059,590

(22) PCT Filed: Jun. 28, 2019

(86) PCT No.: PCT/IB2019/055492
§ 371 (c)(1),
(2) Date: Nov. 30, 2020

(87) PCT Pub. No.: WO2020/008311
PCT Pub. Date: Jan. 9, 2020

(65) Prior Publication Data
US 2021/0253922 A1 Aug. 19, 2021

(30) Foreign Application Priority Data

Jul. 2, 2018 (SE) .................................. 1850830-9
Dec. 21, 2018 (SE) .................................. 1851647-6

(51) Int. Cl.
*C09J 197/00* (2006.01)
*B27N 3/00* (2006.01)
*B27N 3/02* (2006.01)
*B27N 3/04* (2006.01)
*C08K 5/1515* (2006.01)

(52) U.S. Cl.
CPC .......... *C09J 197/005* (2013.01); *B27N 3/002* (2013.01); *B27N 3/02* (2013.01); *B27N 3/04* (2013.01); *C08K 5/1515* (2013.01)

(58) Field of Classification Search
CPC ........ C09J 197/005; B27N 3/002; B27N 3/02; B27N 3/04; C08K 5/1515
USPC ....................................................... 524/799
See application file for complete search history.

(56) References Cited

U.S. PATENT DOCUMENTS

| | | | |
|---|---|---|---|
| 3,935,101 A * | 1/1976 | Briggs | C02F 1/54 210/730 |
| 11,104,774 B2 | 8/2021 | Areskogh et al. | |
| 2015/0175882 A1 * | 6/2015 | Passauer | C09K 17/16 530/500 |
| 2015/0329753 A1 | 11/2015 | Billington et al. | |
| 2016/0208134 A1 * | 7/2016 | Zafar | C08L 97/005 |
| 2016/0369141 A1 | 12/2016 | Pietarinen et al. | |
| 2022/0243105 A1 | 8/2022 | Zafar et al. | |

FOREIGN PATENT DOCUMENTS

| | | | |
|---|---|---|---|
| CN | 107735476 A | | 2/2018 |
| EP | 3009462 A1 | | 10/2015 |
| JP | 2004210816 A | * | 7/2004 |
| JP | 2005290020 A | | 10/2005 |
| JP | 2011116930 A | | 6/2011 |
| JP | 2011218775 A | | 11/2011 |
| JP | 2022539516 A | | 9/2022 |
| WO | 2006031175 A1 | | 3/2006 |
| WO | 2015114976 A1 | | 8/2015 |

OTHER PUBLICATIONS

Nonaka, Yuji et al., Synthesis of Lignin/Epoxy Resins in Aqueous Systems and Their Properties, Holzforschung, vol. 51, 1997, No. 2.
Extended European Search Report for corresponding European application No. EP 19830817.3 dated Feb. 14, 2022.
Sakamoto Yakuhin Kogyo Co., Mar. 31, 2016 [accessed on May 23, 2019] Retrieved from the Internet: https://www.sy-kogyo.co.jp/product/poli-mono-epoxy.html.
Jingxian Li, Russel et al., A lignin-epoxy resin derived from biomass as an alternative to formaldehyde-based wood adhesives, The Royal Society of Chemistry, 2018, DOI: 10.1039/c7gc03026f.
Engelmann, Gunnar et al., Bio-based epoxy resins with low molecular weight kraft lignin and pryogallol, Holzforschung 2014, 68(4): 435-446.
International Search Report from corresponding PCT application No. PCT/IB2019/055492 dated Sep. 27, 2019.

(Continued)

*Primary Examiner* — Ling Siu Cho
*Assistant Examiner* — Ronald Grinsted
(74) *Attorney, Agent, or Firm* — Greer, Burns & Crain, Ltd.

(57) ABSTRACT

The present invention relates to a process for preparing a bonding resin, wherein lignin is provided in the form of an aqueous solution and mixed with one or more of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxy propylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms; and optionally one or more additives. The bonding resin is useful for example in the manufacture of laminates, mineral wool insulation and wood products such as plywood, oriented strandboard (OSB), laminated vencer lumber (LVL), medium density fiberboards (MDF), high density fiberboards (HDF), parquet flooring, curved plywood, veneered particleboards, veneered MDF or particle boards.

13 Claims, No Drawings

(56) References Cited

OTHER PUBLICATIONS

Office action from corresponding Swedish application No. 1850830-9 dated Dec. 27, 2018.
Yuji Nonaka et al., Viscoelastic Properties of Lignin/Epoxy Resins and Their Adhesive Strength, Lumber Industry, 1996, 51 Volumes, No. 6, 250-254.
Office action from corresponding Chinese application No. 201980040328.7, issued on Jun. 1, 2023.
Lijun Yang, Building Decoration Materials, Tianjin University Press, 1st edition, Sep. 2014, pp. 232-233.
Zidong Li et al., Adhesive Additives, Chemical Industry Press, 1st edition, Jun. 2009, pp. 3 and 655.
Sy-Kogyo Co., Polyepoxy type, Mar. 31, 2016, pp. 1-2, list of special epoxy products, URL: https://web.archive.org/web/20160331123919/ https://www-sy-kogyo,co.jp/product/poli-mono-expoxy.html, (May 23, 2019), XP009525480.
Office action from corresponding Japanese application No. 2020-570001, issued on Mar. 15, 2023.
Takada et al., "Preparation and Properties of Bio-Based Epoxy Montomorillonite Nanocomposites Derived from Polyglycerol Polyglycidyl Ether and e-Polylysine", Journal of Applied Polymer Science, 113, 2009, 479-484.
Office Action from corresponding European application No. 19830817.3, dated Jun. 10, 2024.

\* cited by examiner

PROCESS FOR PREPARING A BONDING RESIN

This application is a U.S. National Phase under 35 U.S.C. § 371 of International Application No. PCT/IB2019/055492 filed Jun. 28, 2019, which claims priority under 35 U.S.C. §§ 119 and 365 to Swedish Application No. 1850830-9, filed Jul. 2, 2018 and to Swedish Application No. 1851647-6, filed Dec. 21, 2018.

FIELD OF THE INVENTION

The present invention relates to a process for preparing a bonding resin, wherein lignin is provided in the form of an aqueous solution and mixed with one or more of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms; and optionally one or more additives. The bonding resin is useful for example in the manufacture of laminates, mineral wool insulation and wood products such as plywood, oriented strandboard (OSB), laminated veneer lumber (LVL), medium density fiberboards (MDF), high density fiberboards (HDF), parquet flooring, curved plywood, veneered particleboards, veneered MDF or particle boards. The bonding resin is also useful for example in composites, molding compounds, foundry applications and coatings for paper, wood or metal substrates.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of laminate and structural wood products such as plywood, oriented strand board and fiberboard. During synthesis of such adhesives, phenol, which may be partially replaced by lignin, is reacted with formaldehyde in the presence of either basic or acidic catalyst to form a highly cross-linked aromatic resins termed novolacs (when utilizing acidic catalysts) or resoles (when utilizing basic catalysts). Currently, only limited amounts of the phenol can be replaced by lignin due to the lower reactivity of lignin.

One problem when preparing resins comprising lignin is the use of formaldehyde, when the lignin is used in formaldehyde-containing resins, such as lignin-phenol-formaldehyde resins. Formaldehyde based resins emit formaldehyde, which is a toxic volatile organic compound. The present and proposed legislation directed to the lowering or elimination of formaldehyde emissions have led to the development of formaldehyde free resin for wood adhesive applications.

Jingxian Li R. et al. (Green Chemistry, 2018, 20, 1459-1466) describes preparation of a resin comprising glycerol diglycidyl ether and lignin, wherein the lignin is provided in solid form. One problem with the technology described in the article is a long pressing time and high pressing temperature. The 3 plies plywood sample was pressed at 150° C. temperature for 15 minutes to fully cure the resins.

Engelmann G. and Ganster J. (Holzforschung, 2014, 68, 435-446) describes preparation of a biobased epoxy resin with low molecular weight kraft lignin and pyrogallol, wherein the lignin component consists of an acetone extraction from Kraft lignin.

SUMMARY OF THE INVENTION

It has now surprisingly been found that it is possible to easily prepare a bonding resin in which the use of formaldehyde can be avoided. It has also been found that an improved bonding resin can be achieved by providing lignin in the form of a solution. Providing the lignin in the form of a solution speeds up the reaction significantly and hence reduces the pressing time and enables the use of a lower pressing temperature for curing the bonding resin, when manufacturing for example laminates, mineral wool insulation and wood products such as plywood, oriented strandboard (OSB), laminated veneer lumber (LVL), medium density fiberboards (MDF), high density fiberboards (HDF), parquet flooring, curved plywood, veneered particleboards, veneered MDF or particle boards. The bonding resin is also useful for example in composites, molding compounds, foundry applications and coatings for paper, wood or metal substrates.

The present invention is thus directed to a method for preparing a bonding resin, wherein an aqueous lignin solution is mixed with one or more of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms.

One aspect of the present invention is a method for preparing a bonding resin, wherein an aqueous lignin solution is mixed with one or more cross-linkers and/or one or more glycidyl ethers, wherein the cross-linker has an epoxy index above 4 eq/kg. The epoxy index can be determined according to ISO 3001. Preferably, the cross-linker has an epoxy index above 5 eq/kg. The cross-linker is an aliphatic or, preferably, aromatic glycidyl ether. Preferably, the cross-linker is aliphatic.

The glycidyl ethers may be polyfunctional epoxides and the method according to the present invention may use a mixture of epoxides, such as monofunctional, di-functional, tri-functional and/or tetra-functional.

The present invention is thus also directed to the bonding resin obtainable using the method described above and to the use of the bonding resin in the manufacture of laminates, mineral wool insulation and wood products such as plywood, oriented strandboard (OSB), laminated veneer lumber (LVL), medium density fiberboards (MDF), high density fiberboards (HDF), parquet flooring, curved plywood, veneered particleboards, veneered MDF or particle boards. The bonding resin according to the present invention may also be used in or for coatings, such as coatings applied on metal surfaces or wood or other substrates. The present invention is also directed to such laminates, mineral wool insulation and wood products such as plywood, oriented strandboard (OSB), laminated veneer lumber (LVL), medium density fiberboards (MDF), high density fiberboards (HDF), parquet flooring, curved plywood, veneered particleboards, veneered MDF or particle boards manufactured using the bonding resin. The bonding resin according to the present invention may also be used in the manufacture of composites, molding compounds, foundry applications and coatings for paper, wood or metal substrates.

DETAILED DESCRIPTION

It is intended throughout the present description that the expression "lignin" embraces any kind of lignin, e.g. lignin originated from hardwood, softwood or annular plants. Preferably the lignin is an alkaline lignin generated in e.g. the Kraft process. Preferably, the lignin has been purified or isolated before being used in the process according to the present invention. The lignin may be isolated from black liquor and optionally be further purified before being used in the process according to the present invention. The purification is typically such that the purity of the lignin is at least 90%, preferably at least 95%. Thus, the lignin used according to the method of the present invention preferably contains less than 10%, preferably less than 5% impurities. The lignin may then be separated from the black liquor by using the process disclosed in WO2006031175. The lignin may then be separated from the black liquor by using the process referred to as the LignoBoost process.

The glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units (preferably 2-5 ethylene glycol units, such as 2-3 or 4-5 ethylene units), propylene glycol diglycidyl ether having 1-3 propylene glycol units or 4-5 propylene glycol units (such as 2-4 propylene glycol units or 2-6 propylene glycol units), and/or diglycidyl ether of terminal diol having a linear carbon chain of 3-6 carbon atoms used according to the present invention acts as a cross-linker. Glycidyl ethers with more functional epoxide groups can be used such as glycerol diglycidyl ether, glycerol triglycidyl ether and sorbitol polyglycidyl ether. Other glycidyl ethers having two to nine alkylene glycol groups (such as 2-4 alkylene glycol groups or 2-6 alkylene glycol groups) can be used, such as diethylene glycol diglycidyl ether, triethylene glycol diglycidyl ether, dipropylene glycol diglycidyl ether and tripropylene glycol diglycidyl ether. As the chain lengths between two glycidyl ether groups gets longer, the resin becomes more flexible, which may negatively influence its performance. It results in an adhesive during curing. Typically, the bonding resin according to the present invention is and applied to the surfaces of for example veneers, such as in the manufacture of plywood. When the veneers are pressed together under heating, the cross-linking in the bonding resin takes place, resulting in an adhesive.

An aqueous solution of lignin can be prepared by methods known in the art, such as by mixing lignin, alkali and water. The pH of the lignin solution is preferably in the range of from 10 to 14. Examples of alkali include sodium hydroxide, potassium hydroxide and mixtures thereof. The amount of alkali in the aqueous solution is preferably from 0.1 wt-% to 15 wt-% of the solution, such as from 0.1 wt-% to 10 wt-% of the solution.

The weight ratio between lignin (dry weight) and the total amount of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon is preferably in the range of from 1:10 to 10:1. The amount of lignin in the bonding resin is preferably from 5 wt-% to 50 wt-%, calculated as the dry weight of lignin and the total weight of the bonding resin.

The bonding resin may also comprise additives, such as urea, tannin, solvents, surfactants, dispersing agents and fillers.

The amount of urea in the bonding resin can be 0-40% preferably 5-20% calculated as the dry weight of urea and the total weight of the bonding resin.

A filler and/or hardener can also be added to the bonding resin. Examples of such fillers and/or hardeners include limestone, cellulose, sodium carbonate, and starch.

The reactivity of the lignin with the glycidyl ether can be increased by modifying the lignin by glyoxylation, etherification, esterification or any other method where lignin hydroxyl content or carboxylic content or amine content or thiol content is increased.

Other solvents that can be used in the bonding resins according to the present invention are glycerol, ethylene glycol, polyethylene glycol, propylene glycol, polypropylene glycol, sorbitol and/or any terminal diol having a linear carbon chain of 3-6 carbon atoms.

The aqueous lignin solution is preferably mixed with the glycidyl ether at room temperature, such as at a temperature of from 15° C. to 30° C. The mixing is preferably carried out for about 5 minutes to 2 hours. Preferably, the viscosity of the mixture is monitored during mixing, either continuously or by taking samples and determining the viscosity thereof.

EXAMPLES

Example 1

Lignin solution was prepared first by adding 182 g of powder lignin (solid content 90%) and 257 g of water were added to a 1 L glass reactor at ambient temperature and were stirred until the lignin was fully and evenly dispersed. Then, 60 g of 50% alkali solution was added to the lignin dispersion. The composition was stirred for 120 minutes to make sure that the lignin was completely dissolved in the alkaline media.

Example 2

An adhesive formulation was prepared by mixing 30.3 g of lignin alkali solution from Example 1 and 10 g of glycerol diglycidyl ether (Sigma Aldrich) in a beaker for 20 minutes using an overhead stirrer at room temperature.

The adhesive formulation was tested according to the standard testing method EN 205:2016. Target bonding resin content was 150 g/m$^2$ which were spread on one side using a wire round applicator. Hot pressing was performed at 150° C. with a pressure of 1.8 MPa. The total pressing time was 5 minutes. Prior to evaluation, all samples were conditioned according to EN12765:2016 C2. Average data from 10 test specimens with and without conditioning is presented in Table 1.

TABLE 1

Dry and wet shear strength

|  | Shear strength [N/mm$^2$] Dry Strength | Shear strength [N/mm$^2$] Wet Strength |
|---|---|---|
| Adhesive formulation | 14.93 | 5.84 |

Example 3 (Comparative Example)

An adhesive formulation was prepared by mixing 30 g of lignin and 30 g of glycerol diglycidyl ether in a beaker for 20 minutes using an overhead stirrer at room temperature.

The adhesive formulation was tested according to the standard testing method EN 205:2016. Target bonding resin content was 150 g/m$^2$ which were spread on one side using a wire round applicator. Hot pressing was performed at 150° C. with a pressure of 1.8 MPa. The total pressing time was 5 minutes. Most of the samples fell apart after hot-pressing. The pressing time was not enough to fully cure the samples and needed longer time to cure than the system described in Example 2 where it was fully cured in 5 minutes.

Example 4

Birch veneers of thickness 1.54-1.62 mm were sawn to 300×300 mm$^2$ size and conditioned in 20° C., 65% RH prior to manufacture.
Glue mix was formulated according to Table 2.

TABLE 2

Composition of glue for plywood boards

| Component | Amount [g] |
|---|---|
| Glycerol diglycidyl ether | 25 |
| Lignin solution from example 1 | 75 |
| Filler/Hardener (contains limestone, cellulose, sodium carbonate, starch) | 20 |
| Water | 20 |

Target glue content was 155 g/m$^2$ which were spread on one side. Pre-pressing was performed at a pressure of 1.8 MPa for 5 minutes. Hot pressing was performed at 150° C. with a pressure of 1.8 MPa. The total pressing time was 6 minutes 25 seconds.

Shear strength of the test pieces were evaluated according to EN314_1_2005 test method. Prior to evaluation, all samples were conditioned according to 5.1.1 in the EN314_1_2005. Average data from 20 test specimens is presented in Table 3.

TABLE 3

Plywood shear strength

|  | Shear strength [N/mm$^2$] |
|---|---|
| Glue mix from Table 2 | 2.19 |

Example 5

Birch veneers of thickness 1.54-1.62 mm were sawn to 300×300 mm$^2$ size and conditioned in 20° C., 65% RH prior to manufacture.
Glue mix was formulated according to Table 4.

TABLE 4

Composition of glue for plywood boards

| Component | Amount [g] |
|---|---|
| Glycerol diglycidyl ether | 25 |
| Lignin solution from example 1 | 75 |
| Filler/Hardener (contains limestone, cellulose, sodium carbonate, starch) | 20 |
| Water | 20 |

Target glue content was 155 g/m$^2$ which were spread on one side. Pre-pressing was performed at a pressure of 1.8 MPa for 5 minutes. Hot pressing was performed at 130° C. with a pressure of 1.8 MPa. Two plywood panels were prepared with two different hot pressing times, i.e. one with 6 minutes 25 seconds and second with 5 minutes and 25 seconds.

Shear strength of the test pieces were evaluated according to EN314_1_2005 test method. Prior to evaluation, all samples were conditioned according to 5.1.1 in the EN314_1_2005. Average data from 20 test specimens is presented in Table 5.

TABLE 5

Plywood shear strength

|  | Pressing time | Shear strength [N/mm$^2$] |
|---|---|---|
| Glue mix from Table 4 | 6 minutes 25 seconds | 1.9 |
| Glue mix from Table 4 | 5 minutes 25 seconds | 2.2 |

Example 6

Lignin solution was prepared by adding 160 g of powder lignin (solid content 90%) and 229 g of water were added to a 1 L glass reactor at ambient temperature and were stirred until the lignin was fully and evenly dispersed. Then, 35 g of 50% alkali solution and 75 g of urea were added to the lignin dispersion. The composition was stirred for 120 minutes to make sure that the lignin was completely dissolved in the alkaline media.

Example 7

An adhesive formulation was prepared by mixing 69.6 g of lignin alkali solution from Example 6, 9 g of water and 10.5 g of glycerol diglycidyl ether in a beaker for 20 minutes using an overhead stirrer at room temperature. The adhesive formulation was tested in a lap-joint test using an Automated Bonding Evaluation System (ABES) tensile tester.

For this purpose, relatively thin beech veneers of thickness of 0.6 mm were used that were cut into 104×20 mm pieces. Resin was applied to an area of 4 mm×20 mm on one side of one end section of the two pieces. Resin coated, overlapped end section of a series of specimens were pressed together in a hot press at a pressure of 5 kg/m² using pressing time of 90 seconds at pressing temperature of 150° C.

Prior to evaluation, all samples were soaked in water for 24 hours at room temperature. Average data from 5 test specimens with and without conditioning is presented in Table 6.

TABLE 6

Dry and wet shear strength

| | Shear strength [N/mm²] Dry Strength | Shear strength [N/mm²] Wet Strength |
|---|---|---|
| Adhesive formulation | 8.1 | 3.8 |

Example 8

Lignin solution was prepared by adding 344.1 g of powder lignin (solid content 95.9%) and 535.9 g of water were added to a 1 L glass reactor at ambient temperature and were stirred until the lignin was fully and evenly dispersed. Then, 120 g of 50% alkali solution was added to the lignin dispersion. The composition was stirred for 120 minutes to make sure that the lignin was completely dissolved in the alkaline media.

Example 9

An adhesive formulation was prepared by mixing 100 g of lignin alkali solution from Example 8 and 33 g of glycerol diglycidyl ether (CAS No. 72207-80-8) in a beaker for 2 minutes at room temperature.

The resin formulation was used to prepare a 5 ply plywood panel. Birch veneers of thickness 1.54-1.62 mm were sawn to 300×300 mm² size and conditioned in 20° C., 65% RH prior to manufacture. Target glue content was 155 g/m² which were spread on one side. Pre-pressing was performed at a pressure of 1.8 MPa for 5 minutes. Hot pressing was performed at 110° C. with a pressure of 1.8 MPa for 7 minutes.

Shear strength of the test pieces were evaluated according to EN314_1_2005 test method. Prior to evaluation, samples were conditioned for class 1 (dry interior) and class 3 (non-covered exterior) according to 5.1.1 and 5.1.3 in the EN314_1_2005. Average data from 20 test specimens is presented in Table 7.

TABLE 7

Shear strength of test specimen according to EN314_1_2005

| Pressing time | Shear strength [N/mm²] Class 1 | Shear strength [N/mm²] Class 3 |
|---|---|---|
| Example 9 | 2.7 | 1.75 |

Example 10

An adhesive formulation was prepared by mixing 100 g of lignin alkali solution from Example 8 and 33 g of ethylene glycol diglycidyl ether in a beaker for 2 minutes at room temperature.

The resin formulation was used to prepare a 5 ply plywood panel. Birch veneers of thickness 1.54-1.62 mm were sawn to 300×300 mm² size and conditioned in 20° C., 65% RH prior to manufacture. Target glue content was 155 g/m² which were spread on one side. Pre-pressing was performed at a pressure of 1.8 MPa for 5 minutes. Hot pressing was performed at 110° C. with a pressure of 1.8 MPa for 7 minutes.

Shear strength of the test pieces were evaluated according to EN314_1_2005 test method. Prior to evaluation, samples were conditioned according to 5.1.1 and 5.1.3 in the EN314_1_2005. Average data from 20 test specimens is presented in Table 8.

TABLE 8

Shear strength of test specimen according to EN314_1_2005

| Pressing time | Shear strength [N/mm²] Class 1 | Shear strength [N/mm²] Class 3 |
|---|---|---|
| Example 10 | 2.06 | 1.96 |

Example 11

An adhesive formulation was prepared by mixing 100 g of lignin alkali solution from Example 8 and 11 g of sorbitol polyglycidyl ether in a beaker for 2 minutes at room temperature.

The resin formulation was used to prepare a 5 ply plywood panel. Birch veneers of thickness 1.54-1.62 mm were sawn to 300×300 mm² size and conditioned in 20° C., 65% RH prior to manufacture. Target glue content was 155 g/m² which were spread on one side. Pre-pressing was performed at a pressure of 1.8 MPa for 5 minutes. Hot pressing was performed at 110° C. with a pressure of 1.8 MPa for 7 minutes.

Shear strength of the test pieces were evaluated according to EN314_1_2005 test method. Prior to evaluation, samples were conditioned according to 5.1.1 and 5.1.3 in the EN314_1_2005. Average data from 20 test specimens is presented in Table 9.

TABLE 9

Shear strength of test specimen according to EN314_1_2005

| Pressing time | Shear strength [N/mm²] Class 1 | Shear strength [N/mm²] Class 3 |
|---|---|---|
| Example 11 | 1.85 | 1.23 |

Example 12

An adhesive formulation was prepared by mixing 100 g of lignin alkali solution from Example 8 and 33 g of neopentyl glycol diglycidyl ether in a beaker for 2 minutes at room temperature.

The resin formulation was used to prepare a 5 ply plywood panel. Birch veneers of thickness 1.54-1.62 mm were sawn to 300×300 mm² size and conditioned in 20° C., 65% RH prior to manufacture. Target glue content was 155 g/m² which were spread on one side. Pre-pressing was performed at a pressure of 1.8 MPa for 5 minutes. Hot pressing was performed at 110° C. with a pressure of 1.8 MPa for 7 minutes.

Shear strength of the test pieces were evaluated according to EN314_1_2005 test method. Prior to evaluation, samples were conditioned according to 5.1.1 in the EN314_1_2005. Average data from 20 test specimens is presented in Table 10.

TABLE 10

Shear strength of test specimen according to EN314_1_2005

| Pressing time | Shear strength [N/mm²] Class 1 |
| --- | --- |
| Example 12 | 1.47 |

Example 13

An adhesive formulation was prepared by mixing 30.3 g of lignin alkali solution from Example 8 and 10 g of glycerol diglycidyl ether in a beaker for 2 minutes at room temperature.

The adhesive formulation was tested according to the standard testing method EN 205:2016. Target bonding resin content was 150 g/m² which were spread on one side using a wire round applicator. Cold pressing was performed with a pressure of 1.8 MPa for 2 hours. Prior to evaluation, all samples were conditioned according to EN12765:2016 C2. Average data from 10 test specimens with and without conditioning is presented in Table 11.

TABLE 11

Dry and wet shear strength

| | Shear strength [N/mm²] Dry Strength | Shear strength [N/mm²] Wet Strength |
| --- | --- | --- |
| Adhesive formulation | 14.2 | 4.8 |

Example 14

An adhesive formulation was prepared by mixing 29.55 g of lignin alkali solution from Example 8, 5.25 g of glycerol and 5.25 g of glycerol diglycidyl ether in a beaker for 20 minutes using an overhead stirrer at room temperature.

The adhesive formulation was tested in a lap-joint test using an Automated Bonding Evaluation System (ABES) tensile tester.

For this purpose, relatively thin beech veneers of thickness of 0.6 mm were used that were cut into 104×20 mm pieces. Resin was applied to an area of 5 mm×20 mm on one side of one end section of the two pieces. Resin coated, overlapped end section of a series of specimens were pressed together in a hot press at a pressure of 5 kg/m² using pressing time of 90 seconds at pressing temperature of 150° C.

Prior to evaluation, all samples were soaked in water for 24 hours at room temperature. Average data from 5 test specimens with and without conditioning is presented in Table 12.

TABLE 12

Dry and wet shear strength

| | Shear strength [N/mm²] Dry Strength | Shear strength [N/mm²] Wet Strength |
| --- | --- | --- |
| Adhesive formulation | 7.0 | 2.19 |

Example 15

A lignin tannin solution was prepared by adding 33 g of lignin, 5 g of tannin and 12 g of 50% sodium hydroxide solution to 50 g of water. The composition was stirred using an overhead stirrer at room temperature until lignin and tannin was completely dissolved.

An adhesive formulation was prepared by mixing 26.3 g of lignin tannin alkali solution and 10 g of glycerol diglycidyl ether in a beaker for 5 minutes using an overhead stirrer at room temperature.

The adhesive formulation was tested in a lap-joint test using an Automated Bonding Evaluation System (ABES) tensile tester.

For this purpose, relatively thin beech veneers of thickness of 0.6 mm were used that were cut into 104×20 mm pieces. Resin was applied to an area of 5 mm×20 mm on one side of one end section of the two pieces. Resin coated, overlapped end section of a series of specimens were pressed together in a hot press at a pressure of 5 kg/m² using pressing time of 90 seconds at pressing temperature of 150° C.

Prior to evaluation, all samples were soaked in water for 24 hours at room temperature. Average data from 5 test specimens with and without conditioning is presented in Table 13.

TABLE 13

Dry and wet shear strength

| | Shear strength [N/mm²] Dry Strength | Shear strength [N/mm²] Wet Strength |
| --- | --- | --- |
| Adhesive formulation | 7.3 | 3.4 |

Example 16

An adhesive formulation was prepared by mixing 100 g of lignin alkali solution from Example 8 and 33 g of polyglycerol polyglycidyl ether (CAS No. 118549-88-5) in a beaker for 2 minutes at room temperature.

The resin formulation was used to prepare a 5 ply plywood panel. Birch veneers of thickness 1.54-1.62 mm were sawn to 300×300 mm² size and conditioned in 20° C., 65% RH prior to manufacture. Target glue content was 155 g/m² which were spread on one side. Pre-pressing was performed at a pressure of 1.8 MPa for 5 minutes. Hot pressing was performed at 110° C. with a pressure of 1.8 MPa for 7 minutes.

Shear strength of the test pieces were evaluated according to EN314_1_2005 test method. Prior to evaluation, samples were conditioned for class 1 (dry interior) and class 3 (non-covered exterior) according to 5.1.1 and 5.1.3 in the EN314_1_2005. Average data from 20 test specimens is presented in Table 7.

TABLE 14

Shear strength of test specimen according to EN314_1_2005

| Pressing time | Shear strength [N/mm$^2$] Class 1 | Shear strength [N/mm$^2$] Class 3 |
| --- | --- | --- |
| Example 16 | 1.64 | 1.55 |

In view of the above detailed description of the present invention, other modifications and variations will become apparent to those skilled in the art. However, it should be apparent that such other modifications and variations may be effected without departing from the spirit and scope of the invention.

The invention claimed is:

1. A method for preparing a bonding resin, the method comprising:
   mixing an aqueous lignin solution with one or more ethers selected from a group consisting of: glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, propylene glycol diglycidyl ether having 1-5 propylene glycol units, diglycidyl ether of terminal diol having a linear carbon chain of 3-6 carbon atoms, and mixtures thereof,
   wherein the lignin of the aqueous lignin solution has been isolated from black liquor and has not been chemically modified.

2. The method according to claim 1, wherein the ether is polyglycerol polyglycidyl ether.

3. The method according to claim 1, wherein the aqueous lignin solution is an alkali solution.

4. The method according to claim 1, wherein a weight ratio between lignin, calculated on a basis of dry lignin, and a total amount of glycerol diglycidyl ether and/or ethylene glycol diglycidyl ether is between 1:10 to 10:1.

5. A bonding resin obtained by the method of claim 1.

6. A method comprising:
   manufacturing a laminate, mineral wool insulation, wood product, plywood, oriented strandboard (OSB), laminated veneer lumber (LVL), medium density fiberboards (MDF), high density fiberboards (HDF), parquet flooring, curved plywood, veneered particleboards, veneered MDF, or particle boards with the bonding resin of claim 5.

7. The method of claim 6, wherein the bonding resin is provided to a surface in the preparation of the laminate, mineral wool insulation, wood product, plywood, oriented strandboard (OSB), laminated veneer lumber (LVL), medium density fiberboards (MDF), high density fiberboards (HDF), parquet flooring, curved plywood, veneered particleboards, veneered MDF, or particle boards, and
   wherein curing of the bonding resin to form an adhesive takes place when the surface is exposed to pressure and heating.

8. A laminate, mineral wool insulation, wood product, plywood, oriented strandboard (OSB), laminated veneer lumber (LVL), medium density fiberboards (MDF), high density fiberboards (HDF), parquet flooring, curved plywood, veneered particleboards, veneered MDF, or particle boards manufactured to claim 7.

9. The method of claim 1, wherein the mixture further comprises an additive.

10. The method according to claim 9, wherein the additive is urea, tannin, surfactant, dispersing agent, filler, a solvent, or a mixture thereof.

11. The method according to claim 10, wherein the solvent is selected from a group consisting of glycerol, ethylene glycol, polyethylene glycol, propylene glycol, polypropylene glycol, sorbitol, a diglycidyl ether with a terminal diol having a linear carbon chain of 3-6 carbon atoms, and mixtures thereof.

12. A method for preparing a bonding resin, the method comprising:
   mixing an aqueous lignin solution with one or more ethers selected from a group consisting of: glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, propylene glycol diglycidyl ether having 1-5 propylene glycol units, diglycidyl ether of terminal diol having a linear carbon chain of 3-6 carbon atoms, and mixtures thereof, wherein the lignin of the aqueous lignin solution has been isolated from black liquor and modified by glyoxylation, etherification, esterification or any other method where lignin amine content or thiol content is increased.

13. A method for preparing a bonding resin, the method comprising:
   mixing an aqueous lignin solution with one or more cross-linkers, or with one or more glycidyl ethers, or with both, wherein the lignin of the aqueous lignin solution has been isolated from black liquor and has not been chemically modified, and
   wherein the cross-linker has an epoxy index above 4 eq/kg.

* * * * *